United States Patent [19]

Titz et al.

[11] Patent Number: 5,662,765
[45] Date of Patent: Sep. 2, 1997

[54] HEATING UNIT FOR A CORRUGATED-BOARD MANUFACTURING PLANT

[75] Inventors: Felix Titz, Weiherhammer; Gerald Frischholz, Weiden, both of Germany

[73] Assignee: BHS Corrugated Maschinen- und Anlagenbau GmbH, Weiherhammer, Germany

[21] Appl. No.: 542,133

[22] Filed: Oct. 12, 1995

[30] Foreign Application Priority Data

Oct. 18, 1994 [DE] Germany ............... 44 37 159.4

[51] Int. Cl.$^6$ ............... B31F 1/20; B32B 31/26
[52] U.S. Cl. ............... 156/470; 156/499; 156/583.5; 219/463
[58] Field of Search ............... 156/210, 470, 156/499, 583.5, 205; 219/443, 457, 466, 465, 467, 461, 463

[56] References Cited

U.S. PATENT DOCUMENTS

| | | |
|---|---|---|
| 3,861,057 | 1/1975 | Wittstock et al. |
| 4,212,348 | 7/1980 | Kobayashi ............... 165/171 |
| 4,304,178 | 12/1981 | Haberle . |
| 4,659,304 | 4/1987 | Day ............... 425/406 |
| 5,183,525 | 2/1993 | Thomas ............... 156/210 |
| 5,501,762 | 3/1996 | Marschke et al. ............... 156/583.5 |

FOREIGN PATENT DOCUMENTS

| | | |
|---|---|---|
| 0566842 | 4/1992 | European Pat. Off. . |
| 0 566 842 A1 | 3/1993 | European Pat. Off. . |
| 0568785 | 11/1993 | European Pat. Off. . |
| 1337490 | 8/1962 | France . |
| 2056466 | 5/1971 | France . |
| 19 47 368 | 10/1966 | Germany . |
| 2213745 | 3/1972 | Germany . |
| 2213745 | 10/1972 | Germany . |
| 4215086A1 | 5/1992 | Germany . |
| 4230015 | 3/1994 | Germany . |
| 1554992 | 10/1979 | United Kingdom . |

*Primary Examiner*—Michele K. Yoder
*Attorney, Agent, or Firm*—Browdy and Neimark

[57] ABSTRACT

A heating unit for a corrugated board manufacturing plant comprises heating elements which consist of a comparatively thin heating plate and a supporting structure disposed at a distance from, and below, the latter. The heating plate is supported on the supporting structure by thermally insulating props. Furthermore, a heat insulation layer is disposed between the respective heating plate and the supporting structure.

9 Claims, 1 Drawing Sheet

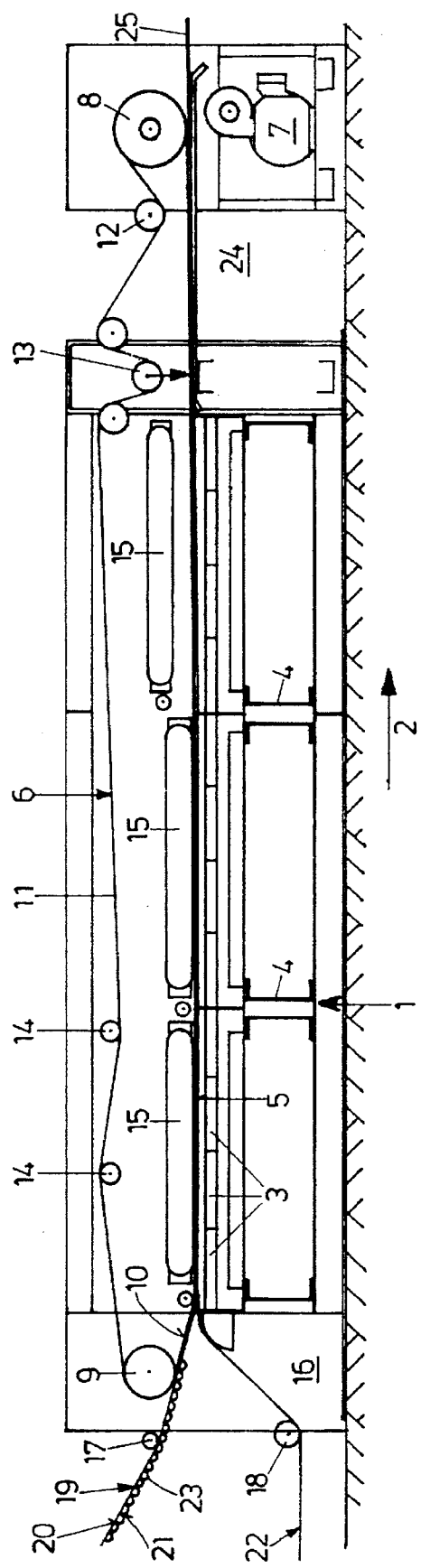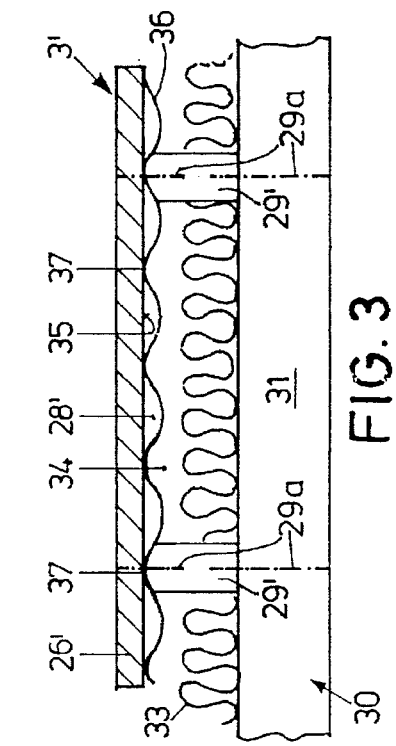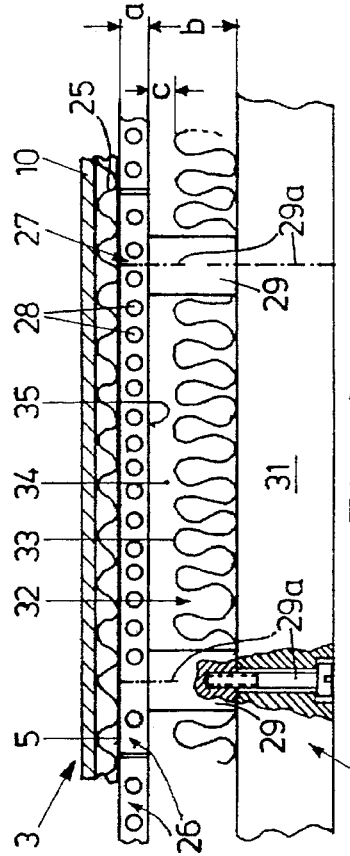

HEATING UNIT FOR A CORRUGATED-BOARD MANUFACTURING PLANT

BACKGROUND OF THE INVENTION

1. Field of the Invention

The invention relates to a heating unit for a corrugated-board manufacturing plant comprising heating elements that have a continuous heating surface extending in the direction of passage of at least two webs to be glued to each other, a drivable continuous conveyor belt, between the lower strand of which and the heating surface the webs to be glued to each other are accommodated, and at least one pressing device for charging the lower strand in the direction towards the heating surface.

2. Background Art

Heating units of the generic type have very thick heating plates, the upper side of which forms the heating surface, heating conduits for heating steam to pass through being provided in the heating plates. For these heating plates to exhibit a plane heating surface as a support for the web of corrugated board to be produced, they must be extraordinarily thick, for instance 150 mm. These heating plates consisting of solid cast iron or a steel structure are characterized by high material requirements. This restfits in heat strongly accumulating in the heating plate so that it reacts rather lazily to changes in heat demand in the case of fluctuations of speed and quality change-over. Since the heat demand cannot be adjusted, defaults will occur such as corrugated board that is crooked or not correctly glued, reductions of speed and quality losses, i.e. there will be restrictions of production, and scrap.

A heating plate for a heating unit of the generic type is known from DE-AS 2 213 745, in which any distorsion of the heating plate by temperature differences is encountered in that support members to which to apply tensile load are provided at the four corners of the heating plate, the remaining edges of the heating plate being provided with support members to which to apply pressure. The support members disposed at the corners are to prevent the heating plate from bending upwardly, while the other support members to which to apply pressure are to oppose any sagging of the heating plate.

DE 42 15 086 A1 teaches, in a heating unit for a corrugated-board manufacturing plant, to secure the heating plates by means of a fastening such that they are adjustable to form a horizontal heating surface. To this end, the heating plates are fixed in a rigid and stationary frame. Further, the ends of the heating plates are supported by way of movable beatings.

SUMMARY OF THE INVENTION

It is the object of the invention to embody a heating unit of the generic type such that any thermal distortion of the heating plates is precluded at least substantially, rapid changes in the heat quantities to be transferred by the heating surface being however possible.

According to the invention, this object is solved in that the heating elements comprise a comparatively thin heating plate and a supporting structure disposed at a distance from, and below, the latter, the heating plate being supported on the supporting structure by thermally insulating props, and a heat insulation layer being disposed between the respective heating plate and the supporting structure. The main principle of the heating unit embodied according to the invention resides in that the two functions of a heating element, namely heat transfer and stability, are thermally separated. The heating plate is very thin, consequently having a correspondingly low capacity of heat accumulation. Changes of the heat demand occurring on the heating surface can be regulated very rapidly, because the heating plate itself is not thermally inert. The supporting structure, which is separate from the heating plate, is not thermally affected by the heating plate.

In particular, the further development, according to which an air gap is provided between the heating plate and the heat insulation layer, ensures that thermally approximately alike conditions prevail on either side of the heating plate, namely on the heating surface and on the lower side of the heating plate, any distorsion of the heating plate being precluded under these aspects, too.

As regards a range of the necessary thickness of the heating plate, 20 mm$\leq$a$\leq$50 mm applies. Possibilities of how to integrate the heating devices into the heating plate or how to connect them with it reside in that heating agent conduits are provided in the heating plate and that they are provided on the side of the heating plate turned away from the heating surface.

As for a range of the distance between the heating plate and the supporting structure, 150 mm$\leq$b$\leq$250 mm applies.

Further features, details and advantages of the invention will become apparent from the ensuing description of exemplary embodiments, taken in conjunction with the drawing.

BRIEF DESCRIPTION OF THE DRAWING

FIG. 1 is a diagrammatic lateral longitudinal view of a heating unit for a corrugated-board manufacturing plant, FIG. 2 is a vertical longitudinal section of a heating element for the heating unit of FIG. 1 on an enlarged scale as compared to FIG. 1, and FIG. 3 is a embodiment, modified as compared to FIG. 2, of a heating element for a heating unit.

DESCRIPTION OF THE PREFERRED EMBODIMENTS

The heating unit for webs of corrugated board illustrated in the drawing is used in a plant for the manufacture of corrugated board. It has a stand 1 comprising heating elements 3 (specified below) which are disposed and supported on a substructure 4 one after the other in the direction of passage 2, i.e. approximately horizontally. The upper side of the heating elements 3 form a plane, smooth heating surface 5. The heating elements 3 may be subdivided transversely to the direction of passage 2.

A continuous conveyor belt 6 is disposed above the heating surface 5, leading along a driving drum 8, which is driven by a motor 7 and which is located at the rear end—referred to the direction of passage 2—of the stand 1. The conveyor belt 6 is further led along a deflection drum 9, which is not driven and which is located at the from end—referred to the direction of passage 2—of the stand 1. Referred to the direction of passage 2, the lower strand 10 of the conveyor belt 6 leads from the deflection drum 9 to the driving drum 8, consequently running along the heating surface 5 above the heating elements 3. The upper strand 11 of the conveyor belt 6 leads—counter to the direction of passage 2—from the driving drum 8 to the deflection drum 9 via a deflection pulley 12, which causes a great angle of belt contact on the driving drum 8, via a belt tensioning pulley 13 and guide rolls 14.

Pressing devices 15 are provided above the lower strand 10, i.e. between it and the upper strand 11 of the conveyor belt 6, serving to press the lower strand 10 in the direction towards the heating surface 5 of the heating elements 3. These pressing devices 15 may be of known design, they may for instance be pressing rolls to be lifted or lowered, or pressure hoods to be actuated pneumatically.

Deflection pulleys 17, 18 are positioned at the front end—referred to the direction of passage 2—of the stand 1, i.e. at the inlet 16. A single-face lined web of corrugated board 19 is supplied via the upper deflection pulley 17, the smooth cover web 20 of the web 19 contacting the lower strand 10 of the conveyor belt 6, whereas the corrugated web 21 already glued to the cover web 20 is disposed underneath the cover web 20, i.e. facing the heating surface 5. A cover web 22 is supplied via the lower deflection pulley 18, running underneath the corrugated web 21 of the single-face lined web of corrugated board 19 directly onto the heating surface 5. Glue has been applied to the downward heads 23 of the corrugated web 21 of the single-face lined web of corrugated board 19 in a preliminary operation and in usual manner. The single-face lined web of corrugated board 19 and the cover web 22 are compressed between the heating surface 5 and the lower strand 10 of the conveyor belt 6 by the action of the pressing devices 15 in a direction towards the heating surface 5. Since the lower strand 10 of the conveyor belt 6 is driven in the direction of passage 2, the cover web 20 rests tightly on the lower strand 10, namely without any relative motion, i.e. without slippage, and passes with the latter through the heating unit. The cover web 22 slides along the heating surface 5. Under the action of the heat of the heating elements 3 and under the slight pressure exercised by the lower strand 10 on the single-face lined web of corrugated board 19 and the cover web 22 in the direction towards the heating surface 5, the glue on the heads 23 of the corrugated web 21 cures, whereby the corrugated web 21 of the single-face lined web of corrugated board 19 is united with the cover web 22. At the outlet 24, i.e. in the vicinity of the driving drum 8, a double-face lined web of corrugated board 25 leaves the heating unit.

FIG. 2 illustrates the structure of the heating elements 3. Each of them has a comparatively thin heating plate 26, these heating plates 26, disposed one beside the other, of the heating elements 3 forming the heating surface 5. These heating plates 26 have heating devices 27 which are drilled heating-agent conduits 28 in the embodiment according to FIG. 2, regularly for the guidance of steam. The thickness a of this heating plate 26 ranges from 20 to 50 mm.

The heating plates 26 are supported on a supporting structure 30 by way of props 29. The supporting structure 30 can be embodied such that several heating plates 26 are supported on a supporting structure 30, as roughly outlined in FIG. 1. The supporting structure 30 substantially consists in a heavy slab 31 of a material of little thermal conductivity and a low coefficient of temperature expansion. It may for instance be of concrete or a fiber-reinforced material. The props 29 themselves also consist of a material of little thermal conductivity, for instance of glass-fiber reinforced plastic material, or they are compound bodies of high insulance. They may be made entirely from insulating, compression-proof plastic material or from metal with an insulating plate, for instance of glass-fiber reinforced plastic material. They are joined to the heating plates 26 on the one hand and to the supporting structure 30 on the other by means of a thermally separate screwing 29a that permits heat expansions of the heating plates 26.

The distance b between the heating plate 26 and the supporting structure 30 is a multiple of the thickness a of the heating plate 26, ranging for instance from 150 to 250 rnm. In the space 32 between the heating plate 26 and the supporting structure 30, a heat insulation layer 33 of insulating material of a high K-value, i.e. of low thermal conductivity, is disposed on the supporting structure 30. Between this heat insulation layer 33 and the heating plate 26, there is an air gap 34, of which the height c corresponds approximately to the thickness a of the heating plate 26. It is the effect of this air gap 34 that approximately the same temperature prevails on the lower side 35, turned away from the heating surface 5, of the heating plate 26 as found in the heating surface 5, this effect precluding any thermal distorsion of the heating plate 26.

FIG. 3 illustrates a modified embodiment of a heating element 3', in which the heating plate 26' itself is a smooth solid steel slab, on the lower side 35 of which heating-agent conduits 28' are formed by a correspondingly profiled metal sheet 36. The profiled metal sheet 36 can be joined to the lower side 35 of the heating plate 26' by spot welding or line welding 37. The design of the props 29' and of the support structure and of the heat insulation layer 33 corresponds to that of the embodiment according to FIG. 2.

What is claimed is:

1. A heating unit for a corrugated-board manufacturing plant, comprising at least one heating element (3, 3') having a continuous heating surface (5) extending in a direction of passage (2) of at least two webs (19, 22) to be glued to each other, a drivable continuous conveyor belt (6) having a lower strand (10), whereby a space is located between said lower strand (10) and the heating surface (5), within which space the webs to be glued to each other are accommodated, and at least one pressing device (15) for charging the lower strand (10) in a direction towards the heating surface (5), wherein the at least one heating element (3, 3') comprises a heating plate (26, 26') of a substantially low thickness (a) and a supporting structure (30) disposed at a distance (b) from, and below, the heating plate (26, 26'), the heating plate (26, 26') being supported on the supporting structure (30) by thermally insulating props (29, 29'), and a heat insulation layer (33) being disposed between the heating plate (26, 26') and the supporting structure (30), and wherein an air gap (34) with a height (c) is provided between the heating plate (26, 26') and the heat insulation layer (33), and the thermally insulating props (29) consist of a material of at least one of little thermal conductivity and a low coefficient of temperature expansion, said thermally insulated props (29, 29') being joined to said heating plates (26) by a thermally separate screwing means (29a) for permitting heat expansion of the heating plates (26).

2. A heating unit according to claim 1, wherein 20 mm≦a≦50 mm applies to the thickness (a) of the heating plate (26).

3. A heating unit according to claim 1, wherein heating agent conduits (28) are provided in the heating plate (26).

4. A heating unit according to claim 1, wherein heating agent conduits (28') are provided on a side (35) of the heating plate (26') turned away from the heating surface (5).

5. A heating unit according to claim 1, wherein 150 mm≦b≦250 mm applies to the distance (b) of the heating plate (26, 26') from the supporting structure (30).

6. A heating unit according to claim 1, wherein 20 mm≦c≦50 mm applies to the height (c) of the air gap (34).

7. A heating unit according to claim 1, wherein several heating plates (26, 26') are supported on the supporting structure (30).

8. A heating unit according to claim 1, wherein the supporting structure (30) is substantially formed by a slab (31) that is thick as compared to the thickness (a) of the heating plate (26, 26').

9. A heating unit according to claim 1, wherein the supporting structure (30) consists of a material of at least one of little thermal conductivity and a low coefficient of temperature expansion.

* * * * *